United States Patent

[11] 3,632,325

| [72] | Inventors | Gaylord H. Evey;<br>John B. Carson, both of Vineland, N.J. |
|---|---|---|
| [21] | Appl. No. | 832,344 |
| [22] | Filed | June 11, 1969 |
| [45] | Patented | Jan. 4, 1971 |
| [73] | Assignee | Richland Glass Company, Inc. |

[54] METHOD OF SEALING GLASS TO METAL
7 Claims, 9 Drawing Figs.

[52] U.S. Cl.................................................. 65/56, 65/59
[51] Int. Cl...................................................... C03c 27/02

[50] Field of Search............................................. 65/56, 59

[56] References Cited
UNITED STATES PATENTS

| 2,279,168 | 4/1942 | Kalischer et al. ............. | 65/59 X |
| 3,141,753 | 7/1964 | Certa............................... | 65/59 X |

*Primary Examiner*—Arthur D. Kellogg
*Attorneys*—Clarence A. O'Brien and Harvey B. Jacobson

ABSTRACT: The use of specific sealing glass formulations utilized when the particular sealing glass formulations are sealed to metal components.

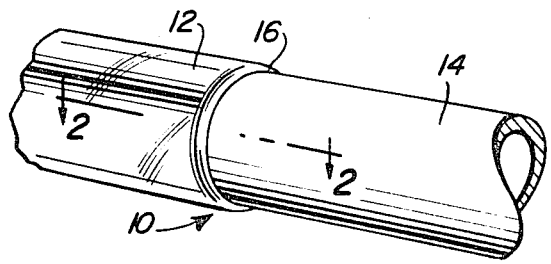
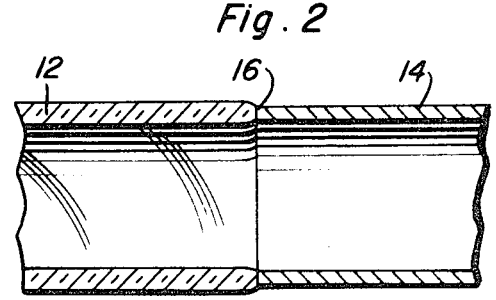
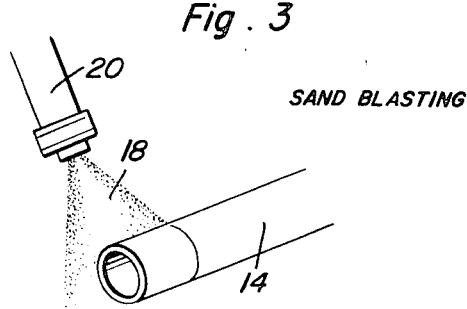
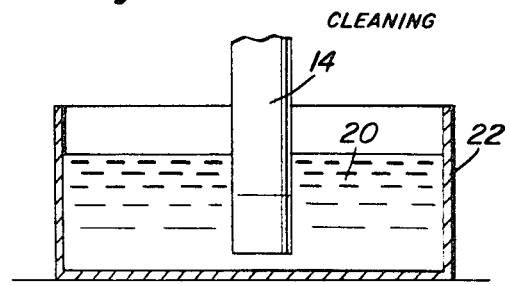
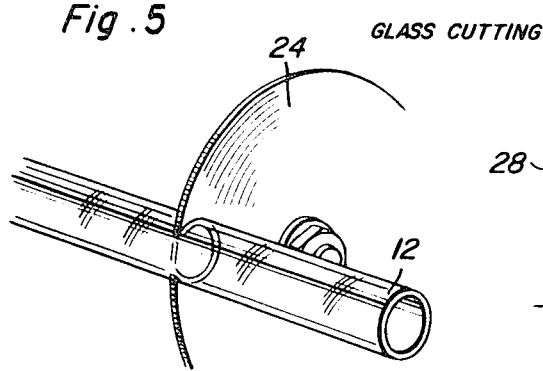
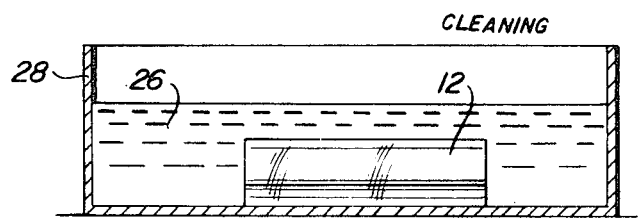
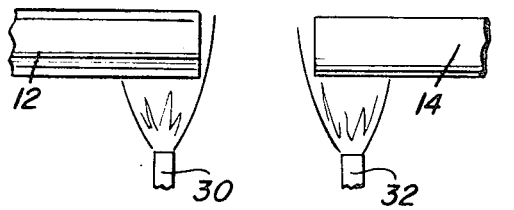
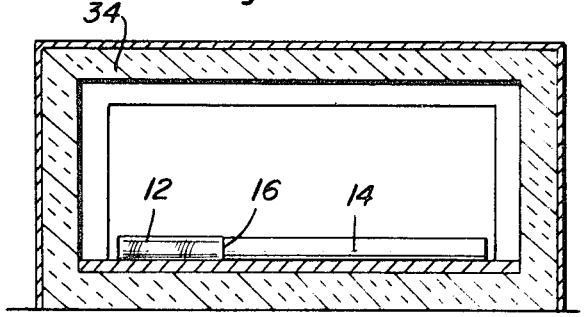
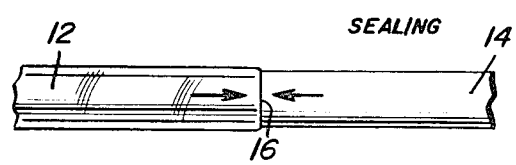
Gaylord H. Evey
John B. Carson

METHOD OF SEALING GLASS TO METAL

It has been previously known to seal sealing glass to metal components which may be Kovar or the like. U.S. Pat. No. 3,311,462, illustrates one particular method of sealing glass to metal and U.S. Pat. No. 3,369,961, discloses specific formulations of glass containing chemical compositions of a sealing glass.

Essentially, this invention encompasses the use of particular formulations of sealing glasses utilized in sealing such glasses to Kovar, Rodar, Fernico, Therlo, similar iron nickel cobalt alloys, molybdenum and glass which has already been sealed to the above metals for electrical and electronic applications.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmental perspective view of a glass and metal component sealed together.

FIG. 2 is a sectional view taken along section line 2—2 of FIG. 1.

FIGS. 3–9 illustrate schematically the procedural steps in preparing the metal and glass and sealing the glass and metal components.

Referring now specifically to the drawings, the completed product illustrated in FIGS. 1 and 2 is generally designated by the numeral 10 and includes a cylindrical glass tube 12 and a cylindrical metal tube 14 joined together with a butt-type seal as at 16. These numerals will be used throughout the description and it is pointed out that other shapes and configurations of glass and metal may be employed while practicing the procedural steps of this invention.

On butt-type seals, a matt-type finish is required and is best obtained by sandblasting the end of the metal component 14 by the use of pure alumina grit 18 discharged from a suitable nozzle structure 20. The surface of the metal in the seal area should be free of die and machine marks or scratches. While circumferential scratches can be tolerated but should be avoided, longitudinal scratches are quite detrimental and must be eliminated.

After sandblasting, the metal component 14 is vapor degreased in trichlorethylene and then is immersed in a cleaning solution 20 contained in a tank 22 for approximately 15 to 20 seconds. The cleaning solution is a 70 percent solution of hydrochloric acid heated to a temperature of approximately 40° to 60° C. The cleaned metal component 14 is then rinsed in tap water for 15 to 20 seconds, triple rinsed in deionized water with a final rinse in C.P. acetone and then hot air dried.

When forming edge-type seals rather than butt-seals, the edge should be broken by a metal remover to provide a radius on the edge of approximately one-half the original thickness of the metal. All machine lubricants employed must be of the type completely dissolvable by trichloroethylene degreasing. The edge sealing area should by polished with 100 grit aluminum oxide and followed by 180 grit to make certain all machine marks, draw marks and scratches are removed with the cleaning procedure for the metal being the same as that set forth in connection with the butt-type seal.

After the metal has been air dried, it is retained in a wet hydrogen atmosphere for approximately 1 hour at 900° C. or for approximately 40 minutes at 1,000° C. For best results, hydrogen should be saturated by bubbling through water at room temperature. Cooling of the metal should then be done in three stages of approximately 15 minutes each. All first parts must be handles with clean metal tweezers or tongs and stored in clean dry containers or sealed plastic bags.

In preparing the glass component or parts, the glass should be cut to proper length preferably with a diamond cutoff wheel 24 to insure a fine edge finish with minimum contamination. The glass parts or components can be cleaned in either of two solutions 26 in a tank 28 by immersion. The two solutions are (1) 10 percent by volume hydrofluoric acid or (2) in a potassium dichromate solution (560 grams potassium dichromate, 140 cc. of $H_2O$ and 14 liters of $H_2SO_4$). The component 12 should lie submerged in the cleaning solution for approximately 10 minutes, rinsed in running water for 3 minutes followed by three rinses in deionized water with a final rinse in C.P. acetone and then hot air dried. The cleaned glass parts should be handled with suitable tweezers or tongs and stored in clean, dry containers or sealed plastic bags. The glass component 12 should be free of defects in the seal area with blisters, stones or knots being particularly detrimental.

Sealing of the glass to metal can be accomplished by either induction heating or flame heating with flame heating being illustrated from the burners 30 and 32. The metal component or part 14 and the glass component or part 12 should be heated evenly to approximately 950° C. in air to develop oxide on the metal part 14 and to soften the glass part sufficiently for sealing. The heated parts 12 and 14 are then brought together by pressure to insure proper joining of the glass to the oxidized metal surface in a manner to sufficiently avoid reentrant angles in the seal after which the metal to glass sealed parts should be annealed.

The components 12 and 14 are annealed in an oven 34 or in a furnace having an atmosphere of 85 percent nitrogen and 15 percent hydrogen flushed for 30 minutes prior to bringing temperature to 1,015° C. where a recommended soak period of 3 hours is desirable. Cooling should then be at 2° per minute until 970° C. has been reached and thereafter cooling should be 5° per minute until room temperature is reached. It is essential that gas flow be maintained at all times and that a maximum temperature of 1,040° C. not be exceeded in order to avoid the formation of a darkened seal. By maintaining these conditions, the metal component or parts will be retained clean and bright after annealing. The chemical composition of the glasses employed are set forth in approximate percentage calculated by batch weight.

EXAMPLE I

| | |
|---|---|
| $SiO_2 + B_2O_3$ | 80%. |
| $PbO + ZnO$ | 0 or very minute. |
| $Na_2O\ K_2O, Li_2O$ | 7%. |
| $Al_2O_3$ | 7%. |
| $BaO$ | 2%. |
| $B_2O_3$ | 10% (already included above. |
| $ZnO$ | 0 or very minute. |
| $CaO$ | 1%. |

EXAMPLE II

| | |
|---|---|
| $SiO_2$ | 70%. |
| $PbO$ | 0 or very minute. |
| $K_2O$ | 1%. |
| $Na_2O$ | 6%. |
| $Li_2O$ | 0 or very minute. |
| $Al_2O_3$ | 7%. |
| $B_2O_3$ | 10%. |
| $As_2O_3$ | Not listed. |
| $BaO$ | 2%. |
| $CaO$ | 1%. |

NOTE.—Plus trace ingredients.

The physical properties of the glasses are as follows:
Working point 1,175° to 1,190° C.
Softening point 795° to 797° C.
Annealing point 574° to 577° C.
Strain point 535° to 542° C.
Density 2.36 g.-cc.

As set forth above in the chemical compositions, the glasses employed have no or only very minute quantities of PbO and ZnO. The sealing glass or noncorrosive flint glass may thus be effectively sealed to various metals or glass which has already been sealed to the above metals with the glass being relatively inexpensive in cost and the procedure being relatively simple and inexpensive to practice thus enabling an effective glass to metal seal which will reduce the overall cost of such items. The specific glasses involved and the procedural steps constitute the essential features of the invention.

The foregoing is considered as illustrative only of the principles of the invention. Further, since numerous modifications and changes will readily occur to those skilled in the art, it is not desired to limit the invention to the exact method, operation and product shown and described, and accordingly all suitable modifications and equivalents may be resorted to, falling within the scope of the invention.

What is claimed as new is as follows:

1. In the art of sealing a sealing glass to metal components such as Kovar, Rodar, Fernico, Therlo, other similar iron, nickel, cobalt alloys, molybdenum, or glass which has already been sealed to the metals for electrical and electronic applications, that improvement consisting essentially of utilizing specific sealing glass formulations when sealing the sealing glass to the metal components or other glass previously sealed to the metal components, said sealing glass being sealed to a metal component by employing a process consisting essentially of the steps of sandblasting the seal area of the metal part, vapor degreasing the metal part, immersing the metal part in an acid solution, rinsing the metal part in tap water, rinsing the metal part in deionized water, rinsing the metal part in acetone, hot air drying the metal part, firing the dried metal part in a wet hydrogen atmosphere, retaining the dried parts in clean condition, cutting the glass part to desired dimension with a fine edge finish, cleaning the glass parts in a liquid cleaning solution by immersion for approximately 10 minutes, rinsing the cleaning solution from the glass in tap water for approximately 3 minutes, rinsing the glass part in deionized water, rinsing the glass part in acetone, hot air drying the glass part, maintaining the cleaned and dried glass part in clean condition, heating the cleaned metal and glass part to approximately 950° C. in air to develop oxide on the metal part and to soften the glass part for sealing, bringing the heated parts together by pressure, and annealing the sealed metal and glass parts.

2. The process as defined in claim 1 wherein said step of annealing includes placing the sealed parts in an oven having an atmosphere of approximately 85 percent nitrogen and 15 percent hydrogen which has been flushed for approximately 30 minutes prior to bringing the temperature to 1,015° C., soaking the parts in the heat for a predetermined period of time, cooling the metal and glass parts at approximately 2° per minute until approximately 970° C. has been reached and thereafter cooling the glass and metal parts approximately 5° per minute to room temperature.

3. The process as defined in claim 1 in which the vapor degreasing is accomplished in trichloroethylene, said acid solution being approximately a solution of 70 percent hydrochloric acid heated to a temperature of approximately 40 to 60° centigrade with the metal parts being immersed therein for approximately 15 to 20 seconds.

4. The process as defined in claim 1 in which the metal parts are fired in a wet hydrogen atmosphere for approximately 1 hour at approximately 900° C. with the fired parts being cooled in three stages of approximately 15 minutes each.

5. The process as defined in claim 1 in which the glass part cleaning solution is approximately a 10 percent by volume hydrofluoric acid solution.

6. The process as defined in claim 1 in which the glass part cleaning solution is a potassium dichromate solution including approximately 560 grams potassium dichromate, approximately 140 cc. of $H_2O$ and approximately 14 liters of $H_2SO_4$.

7. The method of sealing a glass component to a metal component consisting of the steps of cleaning and drying the metal component by successively sandblasting, vapor degreasing, acid solution immersing, rinsing in water, rinsing in acetone, hot air drying and firing in a wet hydrogen atmosphere; cleaning and drying the glass component by successively immersing in a cleaning solution, rinsing in water, rinsing in acetone and hot air drying; heating the cleaned and dry metal and glass components in air to oxidize the metal component and soften the glass component; and abutting the both components together to effect a seal therebetween.

* * * * *